(No Model.)
W. H. PECKHAM.
SPECTACLES.
No. 328,513. Patented Oct. 20, 1885.
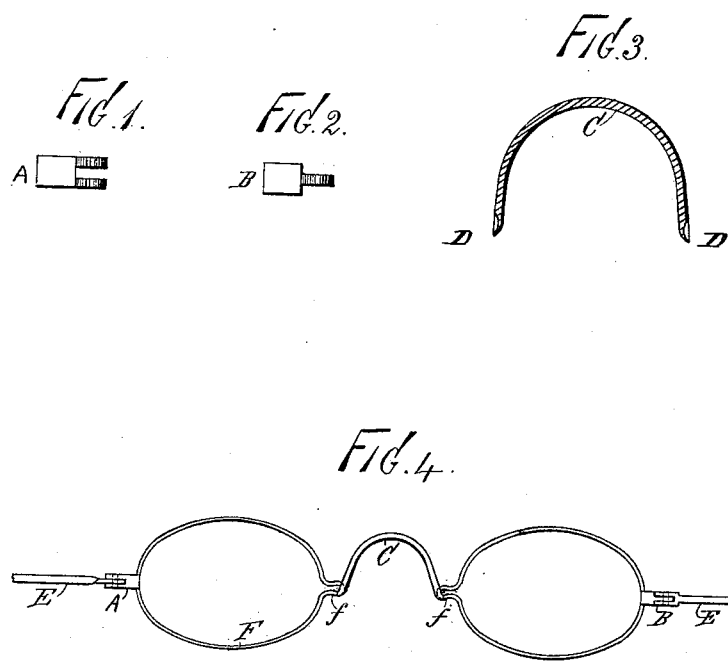
Witnesses:
Inventor:

UNITED STATES PATENT OFFICE.

WILLIAM H. PECKHAM, OF NEW YORK, N. Y.

SPECTACLES.

SPECIFICATION forming part of Letters Patent No. 328,513, dated October 20, 1885.

Application filed October 1, 1883. Renewed January 27, 1885. Serial No. 154,163. (No model.)

*To all whom it may concern:*

Be it known that I, WILLIAM H. PECKHAM, a citizen of the United States, residing in the city, county, and State of New York, have invented a new and useful Improvement in Spectacle and Eyeglass Frames, of which the following, taken in connection with accompanying drawings, is a full, clear, and accurate description.

My invention relates to an improved construction of spectacle-frames or eyeglass-frames, by means of which I am enabled to use solid end pieces for the attachment of the temple-bars of the spectacles or the handle of eyeglasses while using eye-wires which are made elastic, so as to permit the ready insertion of the lenses.

In my Patent No. 192,125, granted January 19, 1877, I described a mode of making the nose-wire of spectacles or eyeglasses in two pieces, connected to the parts of the lens-frames in such a manner as to afford elasticity to the latter for the insertion of the lenses. In my Patent No. 255,530, granted March 28, 1882, I described a mode of making the eye-wires elastic by the use of a loop at the inner end, which loops are clamped by means of sockets formed on the ends of a rigid nose-piece, the said sockets serving to clamp the eye-wires to the lenses.

My present improvement consists of an improved mode of combining a solid nose-piece formed with sockets at its ends with elastic eye-wires provided with solid end pieces for the reception of the temple-bars or the handle of spectacles and eyeglasses, respectively, the socketed nose-piece being combined with the elastic eye-wires in such a manner as not to impair the elasticity of the latter, but to permit the free springing open of the eye-wires for the insertion of the lenses after the spectacle-frame has been completely formed and assembled, and as often thereafter as may be desired. To this end I so attach the socketed ends of the solid nose-piece to the end or side of each of the eye-wire loops that the sockets do not embrace any considerable part of the length of the wire loops, so as to clamp the said eye-wires upon the lenses, as in my former patent, but by leaving the said loops free preserve the elasticity of the eye-wires for the insertion and removal of the lenses after the frame is completed.

In the drawings, Figure 1 represents one form of the improved end piece. Fig. 2 represents another form of the same. Fig. 3 represents the improved nose-piece. Fig. 4 represents a spectacle-frame, the eye-wires of which are provided with spring-loops, and which frame shows my improvements.

My improvement in end pieces consists in making each of a solid piece of metal, one end of which end piece is attached to the eye-wire. When used for spectacle-frames, the other end is preferably either slotted, as shown in Fig. 1, or countersunk, as shown in Fig. 2, to receive the end of the temple-bar, which is attached thereto by a screw or rivet. When used for eyeglasses, the end piece may be made solid without slotting or countersinking, and the handle of the eyeglass can be attached directly thereto. By making this end piece solid in the manner stated I obtain a rigid durable bearing for the temple-bar, not liable to get out of order, and which can be made far cheaper than the ordinary end pieces now in use.

My improvement in nose-pieces consists in making said nose-piece of a single wire, but in the required shape and having the ends grooved or cut out, as shown in Fig. 3, so as to closely fit the sides of the eye-wires. The nose-piece is preferably attached to the spring loops of the eye-wires, where spring-loop eye-wires are used, or if spring-loops are not used, directly to the eye-wires. By means of the grooves in the nose-piece I obtain an easy and inexpensive method of soldering the nose-piece to the eye-wire, adding strength to the juncture without interfering with the elasticity of the eye-wire.

By combining the improved nose-piece with eye-wires having spring-loops and attaching the solid end pieces to the eye-wires I am enabled to produce a strong and serviceable spectacle and eyeglass frame at much less cost of time, material, and labor.

In the drawings, A represents my improved end piece with slot therein; B, the end piece countersunk; C, the improved nose-piece; D, the groove in the end of the nose-piece; E, the temple-bars; F, the eye-wires with spring-loops $f$. In Fig. 4 one end piece is shown slotted and the other countersunk.

I am aware that Letters Patent No. 255,530, granted to me March 28, 1882, embrace a claim to the combination, with eye-wires having spring-loops, of a nose-piece formed with sockets at its opposite ends, whereby it is attached to the said spring-loops, and that said claim is of sufficient breadth to dominate the invention embraced in the present application.

An important practical advantage results from the modified construction described in the present application and embraced in the claims thereof, which does not exist in the construction shown and described in my previous patent above referred to, for the reason that under the previous construction the spring-loops were so embraced by the end sockets of the nose-piece as to clamp the wires upon the lenses, thereby impairing the elasticity of the spring-loops.

My present improvement provides more practically and effectively than what has preceded it perfect facility for inserting and removing the lenses and security against dropping out, while dispensing with any necessity for openings or joints at the outer ends of the lens-frames. For this reason my improved mode of uniting the nose-piece with the spring-loops is of special utility in combination with solid lugs for the temple-bar hinges.

Having thus described my invention, what I claim, and desire to secure by Letters Patent, is—

1. In spectacle or eyeglass frames, the combination of eye-wires having spring-loops with a nose-piece formed with sockets connected to the end or side of the respective eye-wire loops, so as to hold the same without impairing the elasticity of the eye-wire and its loop.

2. In an eyeglass or spectacle frame, the combination of eye-wires having spring-loops, a socketed nose-piece connected thereto without impairing the elasticity of the eye-wires, and a solid end piece or pieces for the reception of the handle or temple-bars, as herein set forth.

In testimony whereof I have hereunto set my hand this 26th day of September, 1883.

WM. H. PECKHAM.

In presence of—
JAMES FITZPATRICK,
CHARLES G. COE.